Figures 1, 2:
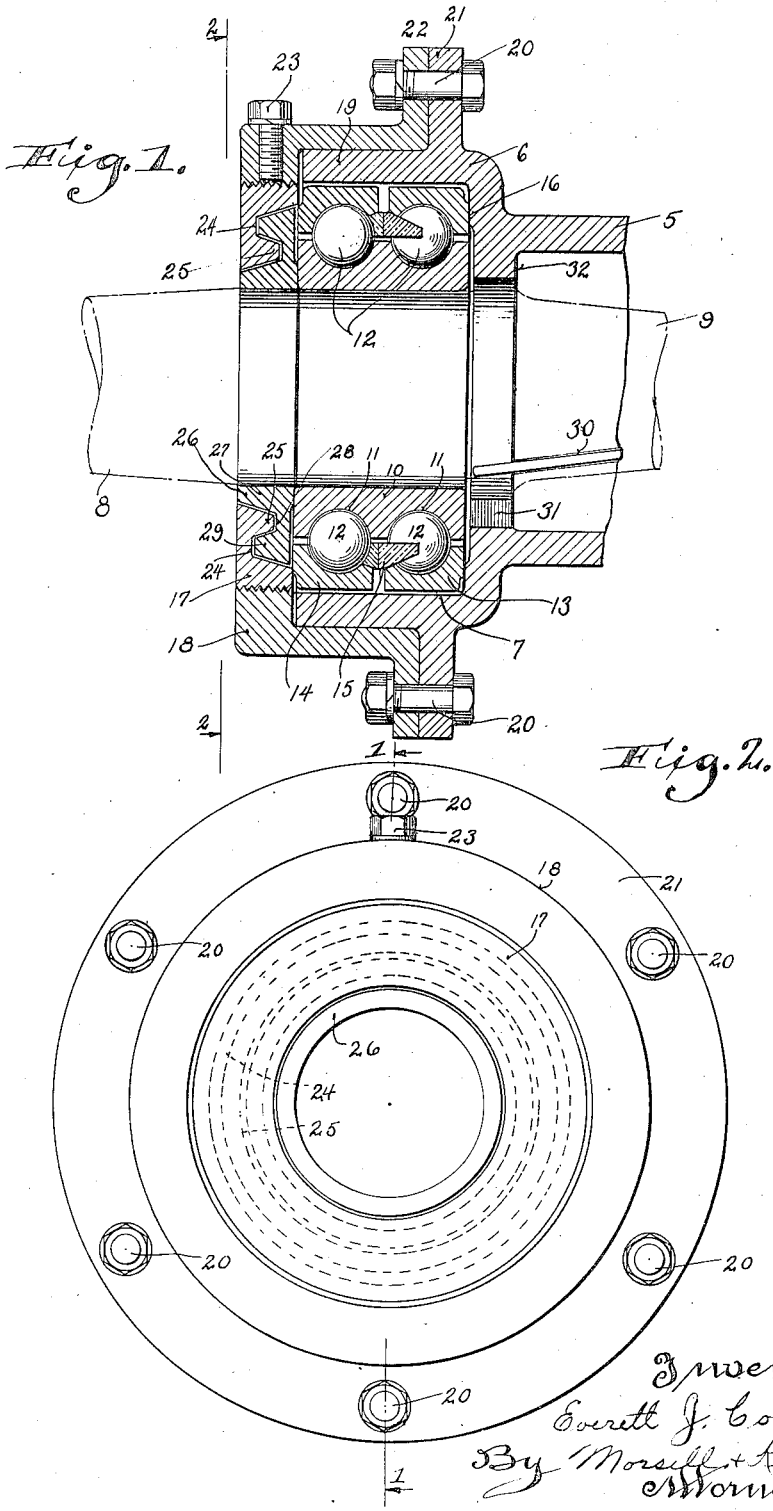

June 12, 1923. 1,458,684

E. J. COOK

AXLE CONSTRUCTION

Filed Aug. 28, 1920

Inventor
Everett J. Cook.
By Morsell + Keeney,
Attorneys.

Patented June 12, 1923.

1,458,684

UNITED STATES PATENT OFFICE.

EVERETT J. COOK, OF OSHKOSH, WISCONSIN, ASSIGNOR OF ONE-HALF TO WISCONSIN PARTS COMPANY, OF OSHKOSH, WISCONSIN, A CORPORATION OF WISCONSIN.

AXLE CONSTRUCTION.

Application filed August 28, 1920. Serial No. 406,722.

*To all whom it may concern:*

Be it known that I, EVERETT J. COOK, a citizen of the United States, and resident of Oshkosh, in the county of Winnebago and State of Wisconsin, have invented new and useful Improvements in Axle Constructions, of which the following is a description, reference being had to the accompanying drawings, which are a part of this specification.

The present invention relates to certain new and useful improvements in axle constructions and refers more particularly to a bearing member for a rear vehicle axle.

It is one of the objects of this invention to provide a bearing for an axle having means for maintaining lubricant within the bearing compartment of the axle housing.

Another object of this invention is to provide an axle housing equipped with a bearing compartment in which is located a bearing member having a cooperating spinner for maintaining lubricant within the bearing compartment by centrifugal action.

Another object of this invention is to provide a structure of the class described which will be of comparatively simple construction, efficient in operation and practical for the purpose described.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a view part in section and part in elevation taken through one end portion of an axle construction on the plane indicated by the line 1—1 of Figure 2; and Figure 2 is a view in elevation looking toward the end of the axle construction on the plane indicated by the line 2—2 of Figure 1.

Referring now more particularly to the accompanying drawing, numeral 5 designates one end of a power driven vehicle rear axle housing which tapers outwardly toward its center to provide the differential or worm gear compartment, not shown, and has its outer end enlarged as at 6 to provide a bearing compartment 7. As usual in constructions of this kind both sides of the housing 5 are identical and therefore but one side is illustrated in the accompanying drawing and the description will be confined to the singular.

Positioned within the housing 5 and having an end 8 projecting outwardly thereof to receive a drive wheel, not shown, is a drive axle 9 which has its inner end connected with the usual drive worm or gear, not shown, positioned within the differential compartment of the axle housing. The portion of the axle 9 passing through the bearing compartment 7 has a sleeve or collar 10 mounted thereon and provided with a double ball race 11 in which tracks a plurality of ball bearings 12, the ball bearings being secured in place by two retaining rings 13 and 14 and a ball retainer spacer 15.

The bearing construction just described has its rear portion abutting the wall 16 of the bearing compartment and is secured within said compartment by an adjusting nut 7 having a threaded connection with a cap portion 18 which is engageable over the turned or sleeve portion 19 of the enlarged portion 6. The cap 18 is secured in position by fastening bolts 20 which pass through laterally directed flanges 21 and 22 formed on the enlargement 6 and the cap 18, respectively. The adjusting nut 17 is locked against accidental movement from adjusted position by the set screw or binding nut 23 carried by the cap and engageable with the periphery of the adjusting nut.

The adjusting nut 17 has its inner face annularly channeled or grooved as at 24 providing an annular rib 25 on its inner face near the bore thereof which is of a diameter greater than that of the axle 9 and has its peripheral wall inclined inwardly and outwardly. Mounted upon the axle 9, between the adjusting nut and bearing member, is a spinner 26 having its hub portion 27 tapered to correspond with the taper of the bore of the adjusting nut and having its outer face annularly channeled as at 28 to receive the rib 25 of the adjusting nut and provided with an annular rib 29 to engage in the annular groove 24 of the adjusting nut.

The spinner 26 rotates with the sleeve 10 and has a slight clearance between the portions thereof adjacent the retaining ring 14 and the adjusting nut 17, which clearance is approximately ten thousandths of an inch. However this clearance may be varied to suit the particular construction. The bearing compartment is supplied with lubricant by a trough 30 having its discharge end adjacent the bearing compartment and the lubricant is retained within the bearing compartment by the centrifugal action set up by the spinner 26. All excess lubricant may be discharged from the bearing compartment through a passageway or opening 31 in the annular rib 32 which partly separates the bearing compartment 7 from the interior of the axle housing 5, see Figure 1.

What I claim as my invention is:

1. In a device of the class described, the combination with a casing having a bearing compartment, a bearing member mounted therein and a shaft journaled in said bearing member, of means comprising a passage within said casing for supplying lubricant to the bearing compartment, and a spinner member mounted on said shaft within the bearing compartment whereby its rotation will retain the lubricant in said compartment by centrifugal force.

2. In a device of the class described, the combination with a bearing compartment, a bearing member mounted therein and a shaft journaled in said bearing member, of an adjusting nut for securing the bearing member in the bearing compartment, and a spinner member between said nut and bearing member for maintaining lubricant within said bearing compartment by centrifugal force.

3. In a device of the class described, the combination with a bearing compartment, a bearing member mounted therein and a shaft journaled in said bearing member, of an adjusting nut for securing the bearing member in said compartment, said nut having an annular groove in its inner face, a spinner member positioned between said nut and bearing member for retaining lubricant within said compartment by centrifugal force, and a part on said spinner member engaging within the annular groove of said nut.

4. In a device of the class described, the combination with a bearing compartment, a bearing member mounted therein and a shaft journaled in said bearing member, of an adjusting nut for securing the bearing member in said compartment, said nut having an annular groove in its inner face, a spinner member positioned between said nut and bearing member for retaining lubricant within said compartment by centrifugal force, and an annular part on said spinner member engaging within the annular groove of said nut, said spinner member and nut being spaced a slight distance.

In testimony whereof, I affix my signature.

EVERETT J. COOK.